(12) United States Patent
Shen et al.

(10) Patent No.: US 12,087,042 B2
(45) Date of Patent: Sep. 10, 2024

(54) METHOD, APPARATUS, AND ELECTRONIC DEVICE FOR TRAINING NEURAL NETWORK MODEL

(71) Applicant: Tencent Technology (Shenzhen) Company Limited, Shenzhen (CN)

(72) Inventors: Rongbo Shen, Shenzhen (CN); Kezhou Yan, Shenzhen (CN); Kuan Tian, Shenzhen (CN); Cheng Jiang, Shenzhen (CN); Ke Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 563 days.

(21) Appl. No.: 17/400,029

(22) Filed: Aug. 11, 2021

(65) Prior Publication Data

US 2021/0374474 A1 Dec. 2, 2021

Related U.S. Application Data

(63) Continuation of application No. PCT/CN2020/098098, filed on Jun. 24, 2020.

(30) Foreign Application Priority Data

Jun. 25, 2019 (CN) .......................... 201910555746.1

(51) Int. Cl.
*G06V 10/774* (2022.01)
*G06F 18/2113* (2023.01)
(Continued)

(52) U.S. Cl.
CPC ...... *G06V 10/7753* (2022.01); *G06F 18/2113* (2023.01); *G06F 18/214* (2023.01); *G06N 3/08* (2013.01)

(58) Field of Classification Search
CPC ............. G06V 10/7753; G06F 18/2113; G06F 18/214; G06F 18/22; G06N 3/08; G06N 3/045; Y02T 10/40
See application file for complete search history.

(56) References Cited

U.S. PATENT DOCUMENTS 11,087,883 B1 * 8/2021 Narayanan ............. G06N 20/00
11,281,941 B2 * 3/2022 Tsishkou ............... G05D 1/0246
(Continued)

FOREIGN PATENT DOCUMENTS

CN 108416370 A 8/2018
CN 108764281 A 11/2018
(Continued)

OTHER PUBLICATIONS

Tencent Technology, WO, PCT/CN2020/098098, Sep. 25, 2020, 5 pgs.
(Continued)

*Primary Examiner* — Mia M Thomas
(74) *Attorney, Agent, or Firm* — Morgan, Lewis & Bockius LLP (57) ABSTRACT

The present disclosure relates to a method for training a neural network model performed at an electronic device. The method includes: performing initial training by using a first training sample set to obtain an initial neural network model; performing a prediction on a second training sample set by using the initial neural network model to obtain a prediction result of each of training samples in the second training sample set; determining a plurality of preferred samples from the second training sample set based on the prediction results; adding the plurality of preferred samples that are annotated to the first training sample set to obtain an expanded first training sample set; updating training of the initial neural network model by using the expanded first
(Continued)

training sample set to obtain an updated neural network model until a training ending condition is satisfied.

17 Claims, 6 Drawing Sheets

(51) Int. Cl.
*G06F 18/214* (2023.01)
*G06N 3/08* (2023.01)

(56) References Cited

U.S. PATENT DOCUMENTS

| | | | | |
|---|---|---|---|---|
| 2013/0097103 | A1* | 4/2013 | Chari | G06N 20/10 |
| | | | | 707/E17.089 |
| 2017/0262750 | A1* | 9/2017 | Kozuka | G06V 20/58 |
| 2019/0325259 | A1* | 10/2019 | Murphy | G06F 18/2148 |
| 2020/0020097 | A1* | 1/2020 | Do | G06F 18/2413 |
| 2020/0258215 | A1* | 8/2020 | Kashyap | G06V 10/82 |
| 2021/0089841 | A1* | 3/2021 | Mithun | G06T 7/90 |
| 2021/0173967 | A1* | 6/2021 | Yang | G06T 19/20 |
| 2021/0327585 | A1* | 10/2021 | Narayanan | G06N 20/00 |
| 2021/0338179 | A1* | 11/2021 | Tian | G06F 18/24 |
| 2022/0114799 | A1* | 4/2022 | Wang | G06T 17/10 |
| 2022/0189142 | A1* | 6/2022 | Wang | G06V 10/273 |
| 2022/0284570 | A1* | 9/2022 | Tan | G06T 7/0012 |
| 2022/0319208 | A1* | 10/2022 | Jiang | G06V 20/698 |
| 2023/0162030 | A1* | 5/2023 | Chen | G06V 10/774 |
| | | | | 706/25 |

FOREIGN PATENT DOCUMENTS

| | | |
|---|---|---|
| CN | 108875816 A | 11/2018 |
| CN | 109886282 A | 6/2019 |
| CN | 109920501 A | 6/2019 |
| CN | 110222785 A | 9/2019 |
| CN | 110245721 A | 9/2019 |

OTHER PUBLICATIONS

Tencent Technology, IPRP, PCT/CN2020/098098, Dec. 28, 2021, 6 pgs.

Tencent Technology, ISR, PCT/CN2020/098098, Sep. 25, 2020, 2 pgs.

* cited by examiner

METHOD, APPARATUS, AND ELECTRONIC DEVICE FOR TRAINING NEURAL NETWORK MODEL

CROSS-REFERENCE TO RELATED APPLICATIONS

This application is a continuation application of PCT Patent Application No. PCT/CN2020/098098, entitled "NEURAL NETWORK MODEL TRAINING METHOD AND APPARATUS, AND ELECTRONIC DEVICE" filed on Jun. 24, 2020, which claims priority to Chinese Patent Application No. 201910555746.1, filed with the State Intellectual Property Office of the People's Republic of China on Jun. 25, 2019, and entitled "METHOD, APPARATUS, AND ELECTRONIC DEVICE FOR TRAINING NEURAL NETWORK MODEL", all of which are incorporated herein by reference in their entirety.

FIELD OF THE TECHNOLOGY

The present disclosure relates to the field of artificial intelligence, and more specifically, to a method for training a neural network model, a method for processing an image, an apparatus for training a neural network model, an electronic device, a system for processing a medical image, and a computer-readable storage medium.

BACKGROUND OF THE DISCLOSURE

A neural network is a large-scale and multi-parameter optimization tool. By virtue of a large amount of training data, the neural network can learn hidden features that are difficult to summarize in the data, thereby completing a large quantity of complex tasks, such as image semantic segmentation, object detection, motion tracking, natural language translation, and the like. The neural network is widely used in artificial intelligence.

During execution of the foregoing complex tasks such as image semantic segmentation, object detection, motion tracking, natural language translation, and the like by using a neural network model, a large amount of manually annotated training sample data is required to train the neural network model, so as to continuously adjust parameter configurations of the entire neural network model during the training, until a neural network model that satisfies a training ending condition is obtained, thereby facilitating execution of subsequent corresponding processing tasks. In order to reduce manual annotation costs of the large amount of training sample data, a part of the training sample data is usually selected through random sampling learning and manually annotated. However, since the random sampling learning is usually to uniformly sample a part of the data from an unannotated training sample data set to be manually annotated, data distribution of the original training sample data set is not changed, that is, a proportion of high-quality samples in the annotated training samples used for training after sampling is not changed. In addition, a quantity of samples in the data set decreases after the sampling, which causes training of the neural network model to be more likely to overfit, resulting in performance degradation.

SUMMARY

Embodiments of the present disclosure provide a method for training a neural network model, a method for processing an image, an apparatus for training a neural network model, an electronic device, a system for processing a medical image, and a computer-readable storage medium.

An aspect of the present disclosure provides a method for training a neural network model, performed by an electronic device, the method including: performing initial training by using a first training sample set to obtain an initial neural network model; performing a prediction on a second training sample set by using the initial neural network model to obtain a prediction result of each of training samples in the second training sample set; determining a plurality of preferred samples from the second training sample set based on the prediction results; adding the plurality of preferred samples that are annotated to the first training sample set to obtain an expanded first training sample set; updating training of the initial neural network model by using the expanded first training sample set to obtain an updated neural network model until a training ending condition is satisfied.

Another aspect of the present disclosure provides a method for processing an image by using a neural network model, performed by an electronic device, the method including: receiving an input image; extracting a feature of the input image by using the neural network model; and outputting a processing result image based on the extracted feature, the neural network model being obtained by using the foregoing method for training a neural network model.

Yet another aspect of the present disclosure provides an electronic device, the electronic device including: a processor; and a memory, configured to store computer program instructions; the computer program instructions, when loaded and executed by the processor, causing the processor to perform the foregoing training method and the foregoing method for processing an image.

Still yet another aspect of the present disclosure provides a system for processing a medical image, the system including: an image acquiring unit, configured to acquire a to-be-processed medical image; an image processing unit, configured to process the medical image to generate an image processing result; and a result outputting unit, configured to output the image processing result, the image processing unit being configured to perform the foregoing training method and the foregoing method for processing an image.

A further aspect of the present disclosure provides a non-transitory computer-readable storage medium, storing computer program instructions, the computer program instructions, when loaded and executed by a processor, causing the processor to perform the foregoing training method and the foregoing method for processing an image.

As described in detail below, according to the method for training a neural network model, the method for processing an image by using a neural network model, the apparatus for training a neural network model, the electronic device, the system for processing a medical image, and the computer-readable storage medium provided in the embodiments of the present disclosure, a plurality of preferred samples are determined from the unannotated training sample set, to retain as much as possible valuable information provided by the training sample set, thereby avoiding a valuable information loss as a result of shrinking of the training sample set caused by random sampling. Moreover, the preferred samples are determined based on the prediction results of the unannotated training samples in the second training sample set, and the preferred samples are annotated and then added to the first training sample set, so that a quantity of samples selected for annotation can be further reduced, and a proportion of high-quality samples in the annotated training samples used for training can be increased, thereby overcoming overfitting that easily occurs during deep learning, and ensuring a more robust training process. In addition, since a quantity of preferred samples is less than a quantity of samples obtained through random sampling, a number of iterations of active deep learning can be reduced, and a quantity of training samples can be significantly reduced and the training of the neural network model can be quickened while obtaining excellent performance. Moreover, by using the neural network model that has been trained based on the foregoing method for training a neural network model, a to-be-processed input image such as a medical image can be more efficiently and precisely processed.

It is to be understood that both the foregoing general description and the following detailed description are exemplary and are intended to provide further explanation of the claimed technology.

BRIEF DESCRIPTION OF THE DRAWINGS

Through a more detailed description of embodiments of the present disclosure in combination with the drawings, the foregoing and other features and advantages of the present disclosure are more obvious. The accompanying drawings are used to provide a further understanding of embodiments of the present disclosure present disclosure, constitute a part of this specification, and are used, together with the embodiments of the present disclosure, to explain the present disclosure, but do not constitute limitations to the present disclosure. In the drawings, the same reference numerals generally represent the same components or steps.

DESCRIPTION OF EMBODIMENTS

In order to make technical solutions and advantages of the present disclosure more obvious, exemplary embodiments according to the present disclosure are described in detail below with reference to the drawings. Apparently, the described embodiments are merely some but not all of the embodiments of the present disclosure. It is to be understood that, the present disclosure is not limited by the exemplary embodiments described herein.

Artificial Intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, the AI is a comprehensive technology of computer science, which attempts to understand essence of intelligence and produces a new intelligent machine that responds in a manner similar to human intelligence. The AI is to study the design principles and implementation methods of various intelligent machines, to enable the machines to have the functions of perception, reasoning, and decision-making.

AI technology is a comprehensive discipline, and relates to a wide range of fields including both hardware-level technologies and software-level technologies. AI foundational technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning (ML)/deep learning.

With the research and progress of the AI technology, the AI technology is studied and applied in a plurality of fields, such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role.

The solutions provided in the embodiments of this application involve technologies such as ML of AI. ML is a multi-field interdiscipline, and relates to a plurality of disciplines such as a probability theory, statistics, an approximation theory, a convex analysis, and an algorithm complexity theory. The ML specializes in studying how a computer simulates or implements a human learning behaviour to obtain new knowledge or skills, and reorganize an existing knowledge structure, so as to keep improving its performance. The ML is a core of the AI, is a basic way to make the computer intelligent, and is applied to various fields of the AI. The ML and deep learning generally include technologies such as an artificial neural network, a belief network, reinforcement learning, transfer learning, inductive learning, and learning from demonstrations. A method for training a neural network model and a method for processing a medical image by using a trained neural network model are described below by using specific embodiments, so as to achieve intelligent healthcare.

Figure 1:
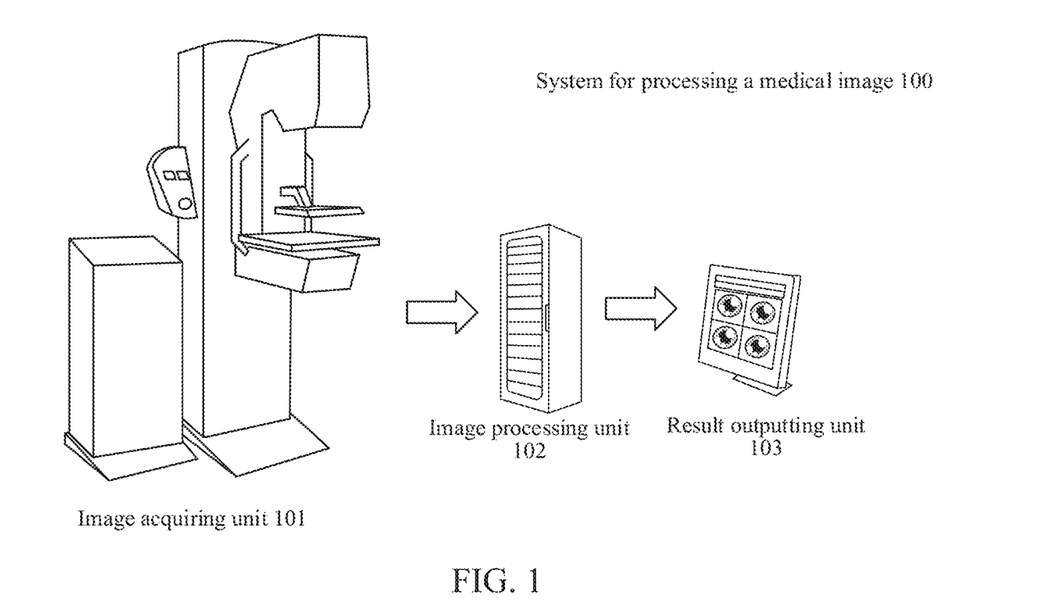
FIG. 1 is a schematic diagram of a system for processing a medical image according to an embodiment of the present disclosure.

First, an application scenario of the embodiments of the present disclosure is schematically described with reference to FIG. 1. FIG. 1 is a schematic diagram of a system for processing a medical image according to an embodiment of the present disclosure.

As shown in FIG. 1, the system 100 for processing a medical image according to an embodiment of the present disclosure includes an image acquiring unit 101, an image processing unit 102, and a result outputting unit 103. The image acquiring unit 101, the image processing unit 102, and the result outputting unit 103 may be configured at the same physical position, or even configured in the same physical device. Alternatively, the image acquiring unit 101, the image processing unit 102, and the result outputting unit 103 may be configured at different physical positions and connected through a wired or wireless communication network to transmit data or commands between each other.

Specifically, the image acquiring unit 101 is configured to acquire a to-be-processed medical image. In this embodiment of the present disclosure, the medical image includes, but is not limited to an angiography image, a computed tomography image, a positron emission tomography image, a nuclear magnetic resonance image, an ultrasound image, and the like.

The image processing unit 102 is configured to process the medical image to generate an image processing result. The image processing unit 102 is, for example, a server, a graphics workstation, a personal computer, or the like. As described in detail below, the image processing unit 102 may extract, by using a neural network model configured therein, a feature of the medical image provided by the image acquiring unit 101, and generate an image processing result based on the extracted feature. The neural network model configured in the image processing unit 102 needs to be pre-trained by using the method for training a neural network model provided in the embodiments of the present disclosure.

The result outputting unit 103 is configured to output the image processing result. The image processing result is, for example, a visual image indicating a position and a state of a lesion in the medical image. The image processing result is generated by the image processing unit 102 by using the trained neural network model. During the generation, rich information of more dimensions that cannot be observed and determined by human eyes, instead of experience and professional knowledge restricted to doctors, is used. Therefore, the medical image is more efficiently and precisely processed.

Figure 2:
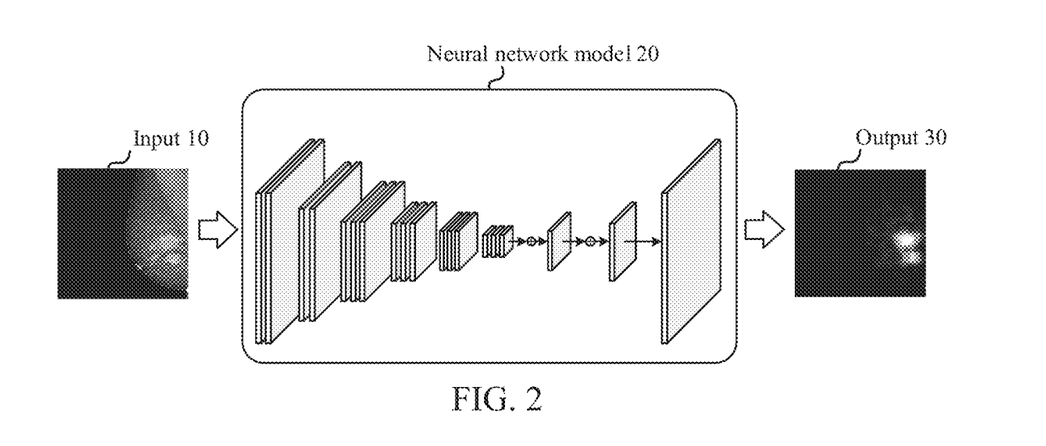
FIG. 2 is a schematic diagram outlining an application scenario of a method for training a neural network model according to an embodiment of the present disclosure.

FIG. 2 illustrates an application scenario of a method for training a neural network model according to an embodiment of the present disclosure.

As shown in FIG. 2, a neural network model 20 according to this embodiment of the present disclosure is configured to receive an input 10, extract a feature of the input 10, and generate an output 30 based on the extracted feature. In this embodiment of the present disclosure, the input 10 may be a to-be-processed object such as an image, a video, natural language text, or the like. The illustrated neural network model 20 performs processing such as image semantic segmentation, object detection, motion tracking, natural language translation, and the like on the input 10 to generate the output 30.

In an embodiment of the present disclosure, the neural network model 20 may be configured in a medical imaging-assisting diagnosis system (such as an AI diagnosis system for Mo-target mammography of breast). In the medical imaging-assisting diagnosis system, the medical image is used as the input 10, and a heatmap outputted by the neural network model 20 is used as the output 30. The output 30 can provide an area of a lesion and show a position and a contour of the lesion through threshold binarization.

For example, in order to detect a position and a contour of a tumor in a Mo-target mammography image, the neural network model 20 may be a peer-to-peer fully convolutional network (FCN) model. In the fully convolutional network model, a convolutional layer of an encoder is used to encode and compress the input image and extract a feature map with lower dimensionality. Afterwards, a deconvolution layer and an up-sampling layer of a decoder are used to decode the feature map, and output a spatial density estimation of the image with an original size, that is, a heatmap. In order to improve accuracy of a pixel-level density estimation, in the fully convolutional network model, a low-level feature map in the encoder may be further fused into the decoder through a skip connection. Such a fully convolutional network model can obtain non-linear and local-to-global feature mapping, which incorporating low-level visual features and high-level semantic information. The heatmap outputted by the fully convolutional network model provides a probability value of each pixel in the input image being a mass lesion, and explicitly shows a salient area of the mass lesion. A position and a contour of the salient area of the mass lesion may be obtained through threshold binarization on the heatmap. It is easily understood that the fully convolutional network model is merely an example, and the neural network model 20 according to the embodiments of the present disclosure may adopt different network structures, including but not limited to a convolutional neural network (CNN), a recurrent neural network (RNN), a U-Net neural network, and the like.

In order to obtain the neural network model 20 applicable to the medical image-assisting diagnosis system, a large quantity of medical images need to be collected as training samples to train an initial neural network model. The collected medical images usually have corresponding medical diagnosis reports. Information provided in the reports may be used as weak supervision information for training of the neural network model 20. The method for training the neural network model 20 provided in this embodiment of the present disclosure is different from a traditional method of manually annotating all collected medical images or randomly sampling some medical images from the collected medical images for annotation. During the training of the neural network model 20 described below, samples having a large amount of information are iteratively selected from an unannotated training sample set, and samples that are more easily detected are further selected from the samples having a large amount of information for annotation, thereby retaining as much as possible valuable information provided by the training sample set, reducing a quantity of samples selected for annotation, overcoming overfitting that easily occurs during deep learning, and ensuring a more robust training process.

Figure 3:
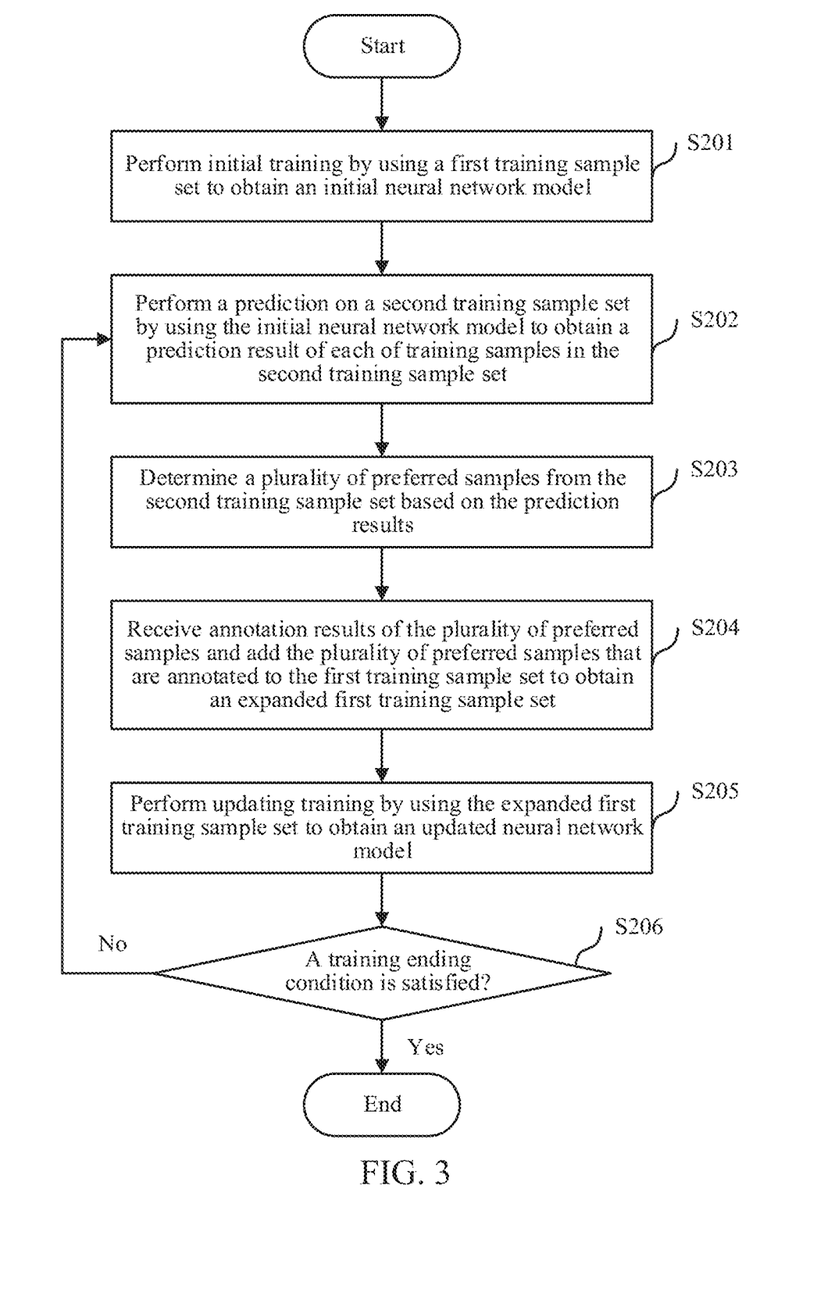
FIG. 3 is a flowchart of the method for training a neural network model according to an embodiment of the present disclosure.
Figure 4:
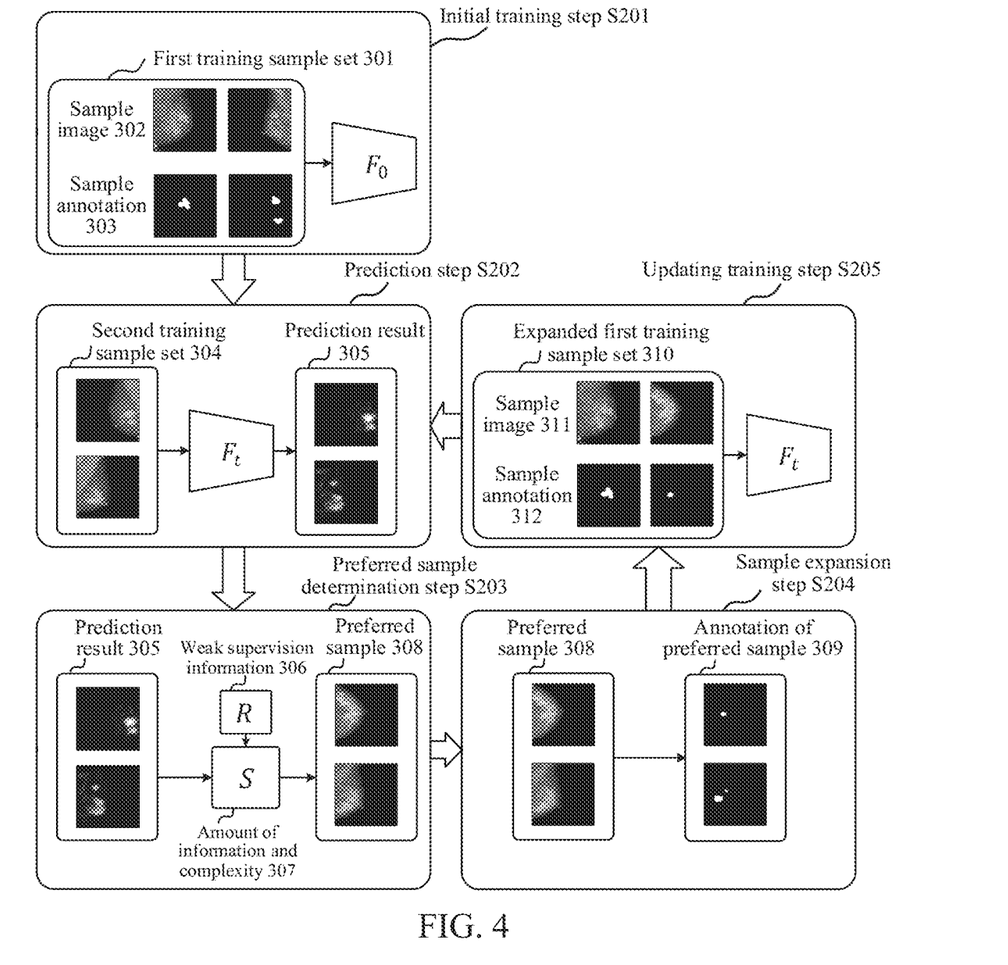
FIG. 4 is a schematic diagram of the method for training a neural network model according to an embodiment of the present disclosure.
Figure 5A:
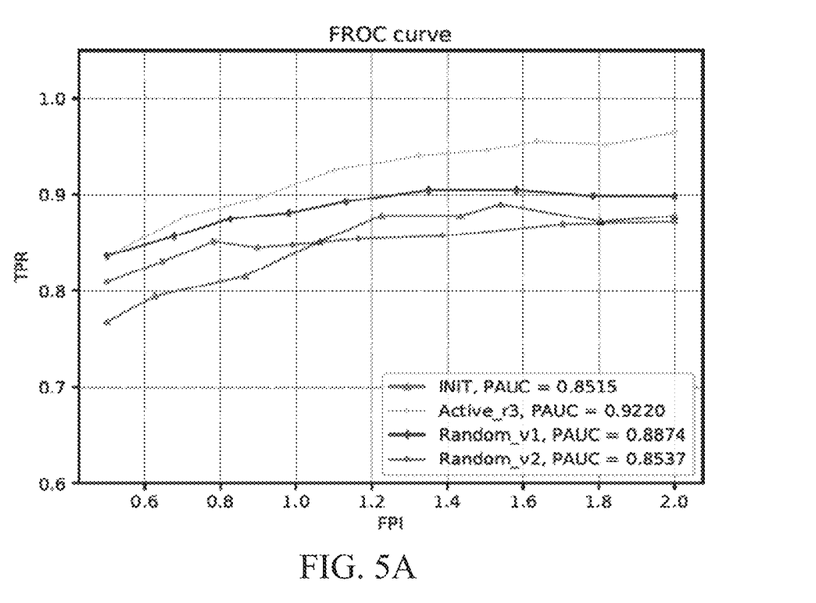
FIG. 5A and FIG. 5B are schematic diagrams of training effects of the method for training a neural network model according to an embodiment of the present disclosure.
Figure 5B:
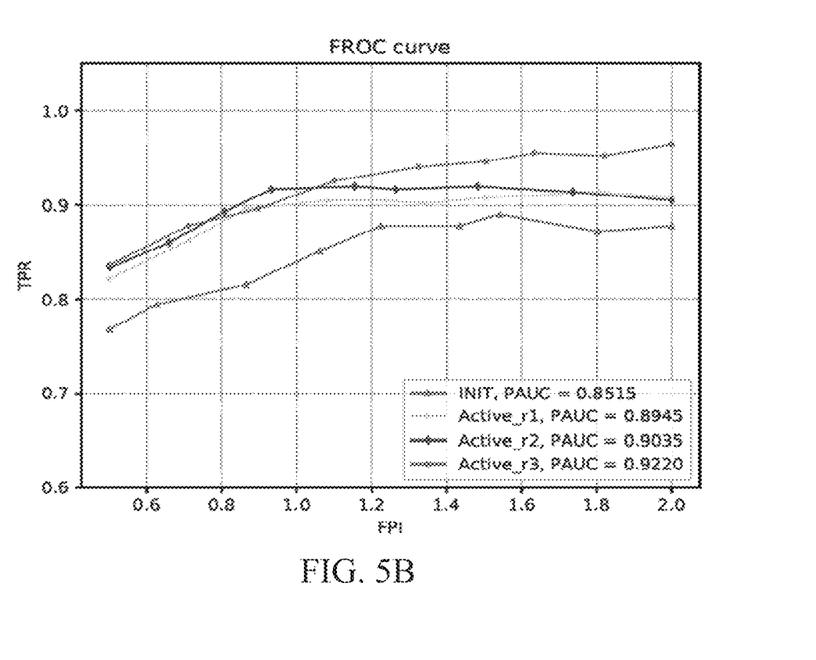

The method for training a neural network model according to an embodiment of the present disclosure is described in detail below with reference to FIG. 3 to FIG. 5B. FIG. 3 is a flowchart of the method for training a neural network model according to an embodiment of the present disclosure. FIG. 4 is a schematic diagram of the method for training a neural network model according to an embodiment of the present disclosure. FIG. 5A and FIG. 5B are schematic diagrams of training effects of the method for training a neural network model according to an embodiment of the present disclosure.

As shown in FIG. 3, the method for training a neural network model according to this embodiment of the present disclosure is performed by an electronic device and includes the following steps:

In step S201, initial training is performed by using a first training sample set to obtain an initial neural network model.

As shown in FIG. 4, in the initial training step S201, initial training is performed on a neural network model Fo by using a first training sample set 301 to obtain an initial neural network model $F_t$. Samples in the first training sample set 301 are annotated samples, that is, the first training sample set includes sample images 302 and corresponding sample annotations 303.

More specifically, in an application scenario of a medical imaging-assisting diagnosis system, a medical imaging expert manually annotates the sample images 302 in the first training sample set 301 to obtain corresponding sample annotations 303. During the manual annotation, information in diagnostic reports attached to the sample images 302 may be used, and sample images with salient lesion visual features are usually selected as the sample images 302 in the first training sample set 301. In addition, as described above, both the sample images 302 in the first training sample set 301 and a sample image in the following second training sample set 304 have an attached diagnosis report as weak supervision information for the training.

In step S202, a prediction is performed on a second training sample set by using the initial neural network model to obtain a prediction result of each of training samples in the second training sample set.

As shown in FIG. 4, in the prediction step S202, a prediction is performed on a second training sample set 304 by using the initial neural network model $F_t$ to obtain a prediction result 305 of each of training samples in the second training sample set 304. The second training sample set 304 includes only unannotated sample images.

More specifically, in the application scenario of the medical image-assisting diagnosis system, the prediction result 305 of each of the training samples is a heatmap corresponding to the sample image.

In step S203, a plurality of preferred samples are determined from the second training sample set based on the prediction results.

As shown in FIG. 4, in the preferred sample determination step S203, a plurality of preferred samples 308 are determined from the second training sample set based on the prediction results 305.

Specifically, the preferred sample determination step S203 includes: determining an amount of information of each of the training samples 304 in the second training sample set 307, and selecting a first predetermined quantity of samples having a large amount of information; and determining, based on a complexity 307 of each of the first predetermined quantity of samples having a large amount of information and in ascending order by complexity, a second predetermined quantity of samples having a large amount of information from the first predetermined quantity of samples having a large amount of information as the plurality of preferred samples 308. In other words, the first predetermined quantity of samples having a large amount of information are found from the unannotated training sample set 304 in descending order by amounts of information of the training samples, so as to retain as much as possible valuable information provided by the training sample set 304, and avoid a valuable information loss as a result of shrinking of the training sample set caused by random sampling. In addition, samples that are more easily detected are further selected from the samples having a large amount of information for annotation, and some samples that are more difficult to detect are gradually annotated during a plurality of iterations of training, so as to update and train the neural network model. In this way, the quantity of samples selected for annotation can be further reduced, and overfitting that easily occurs during the deep learning can be overcome.

More specifically, the large amount of information of the training sample is determined based on both of an uncertainty and a diversity of the sample. The determining an amount of information of each of the training samples in the second training sample set includes: determining an uncertainty and a diversity of each of the training samples in the second training sample set; and performing a weighted calculation on the uncertainty and the diversity to obtain the amount of information of each of the training samples. The determining an uncertainty of each of the training samples in the second training sample set includes: determining the uncertainty of each of the training samples based on the corresponding weak supervision information and the prediction result of each of the training samples. The determining a diversity of each of the training samples in the second training sample set includes: determining the diversity of each of the training samples based on similarities between each of the training samples and other training samples in the second training sample set. In other words, the uncertainty of each of the training samples is determined based on the weak supervision information 306 and the prediction result 305 corresponding to each of the training samples. The diversity of each of the training samples is determined based on similarities between each of the training samples and other training samples in the second training sample set.

In the application scenario of the medical imaging-assisting diagnosis system, the uncertainty of the sample means a confidence that the current neural network model $F_t$ detects a lesion in the sample, which is calculated by using the heat map provided by the current neural network model $F_t$ and the weak supervision information of the sample. The diversity of the sample means a specificity and a representativeness of the sample in all of the samples. A sample having a higher diversity can enrich a feature space of a data set and enhance a generalization capability of model detection. In addition, the diversity of the sample can avoid selecting excessive redundant samples for manual annotation.

Unannotated samples having a large amount of information may be qualitatively classified into 4 categories: "Mismatch", "No recall", "Low recall" and "Excessive false positives". "Mismatch" indicates that no lesion area is recalled but some false positive areas are recalled, "No recall" indicates that neither a lesion area nor a false positive area are recalled, "Low recall" indicates that a lesion area is located but only a small part of the area is recalled, and "Excessive false positives" indicates that a lesion area is recalled but many false positive areas are also recalled. Samples of the types "Mismatch" and "No recall" have higher uncertainties as a result of a larger weight of the lesion area. In addition, usually, few "No recall" and "Low recall" samples are present, and therefore have higher diversities. Therefore, "Mismatch" and "No recall" samples rank higher in evaluation of amounts of information, and account for a majority of samples having a large amount of information.

Each of the training samples in the second training sample set 304 has the corresponding weak supervision information 306, and the complexity of each of the training samples is negatively correlated with a confidence of the corresponding weak supervision information 306 of each of the training samples. In other words, a higher credibility of the weak supervision information indicates a lower complexity of the sample and more convenience to detect the sample. As the training iteration progresses, in order to avoid excessive losses of the diversity of the sample, a proportion of samples that are more easily detected to be sampled from the samples having a large amount of information needs to be increased as the iteration progresses, that is, a higher proportion of samples having a large amount of information need to be retained after a plurality of iterations.

In step S204, annotation results of the plurality of preferred samples are received, and the plurality of preferred samples that are annotated are added to the first training sample set to obtain an expanded first training sample set.

As shown in FIG. 4, in the sample expansion step S204, a plurality of preferred samples 308 are manually annotated, annotations 309 of the preferred samples are received, and the plurality of preferred samples 308 and the annotations 309 corresponding to the preferred samples are added to the first training sample set 301 to form an expanded first training sample set 310.

In step S205, updating training of the initial neural network model is performed by using the expanded first training sample set to obtain an updated neural network model.

As shown in FIG. 4, in the updating training step S205, updating training of the initial neural network model is performed by using the expanded first training sample set 310 to obtain an updated neural network model $F_r$. A sample image 311 in the expanded first training sample set 310 includes the sample images 302 in the original first training sample set 301 and the preferred samples 308 determined in the preferred sample determination step S203. Likewise, a sample annotation 312 in the expanded first training sample set 310 includes the sample annotations 303 in the original first training sample set 301 and the annotations 309 of the preferred samples determined in the sample expansion step S204.

In step S206, it is determined whether a training ending condition is satisfied. The training method ends when the training ending condition is satisfied. The prediction step S202, the preferred sample determination step S203, the sample expansion step S204, and the updating training step S205 are repeated when the training ending condition is not satisfied. In a subsequent prediction step S202 of the iteration, the second training sample set 304 includes remaining unannotated samples that were not selected as the preferred samples in a previous iteration. Specifically, the training ending condition includes the following: the preferred sample determination step does not generate a preferred sample anymore; or the updated neural network model satisfies a predetermined convergence condition.

FIG. 5A and FIG. 5B are FROC curve diagrams showing a comparison between training effects of the method for training a neural network model according to the embodiments of the present disclosure and a training method adopting random sampling learning.

2223 actual image samples are captured as a data set, of which 311 image samples are used as a test set, and 1912 image samples are used for training. In order to initialize the neural network model, 220 image samples are annotated for initial training. For the random sampling learning, two independent tests are performed. In the two tests, 182 image samples are randomly selected from 1692 unannotated image samples for annotation, and then the initial 220 annotated image samples are added to obtain 402 training image samples for each of the tests. Finally, performance obtained by training the neural network model is shown below by Random_v1 and Random_v2 in FIG. 5A.

3 iterations are performed by using the method for training a neural network model according to the embodiments of the present disclosure, until there are not enough preferred samples. In the iterations, 137, 27, and 18 preferred samples are respectively selected, and the initial 220 image samples added thereto to form a total of 402 image samples for manual annotation. Finally, results obtained after the iterations are shown by Active_r1 to Active_r3 in FIG. 5B.

TABLE 1

| Technical solutions: | RL_1 | RL_2 | The present disclosure |
|---|---|---|---|
| PAUC | 0.8874 | 0.8537 | 0.9220 |
| Quantity of annotated samples | 402 | 402 | 402 |

Table 1 shows a performance comparison between the method for training a neural network model according to the embodiments of the present disclosure and the training method adopting random sampling learning. The method for training a neural network model according to the embodiments of the present disclosure can reduce a total quantity of samples for annotation, reduce a quantity of iterations, and achieve more desirable performance.

Based on the application scenario of the method for training a neural network model shown in FIG. 2 and the method for training a neural network model described in FIG. 3 to FIG. 5B, an embodiment of this application provides a method for processing an image by using a neural network model. The method is performed by an electronic device and includes: receiving an input image; extracting a feature of the input image by using the neural network model; and outputting a processing result image based on the extracted feature. The input image may be a to-be-processed medical image, and the image processing result may be a visual image indicating a position and a state of a lesion in the medical image. In addition, the processing result image is generated by the neural network model trained by using the method for training a neural network model described in FIG. 3 to FIG. 5B. During the generation, rich information of more dimensions that cannot be observed and determined by human eyes is used. Therefore, an input image is more efficiently and precisely processed.

Figure 6:
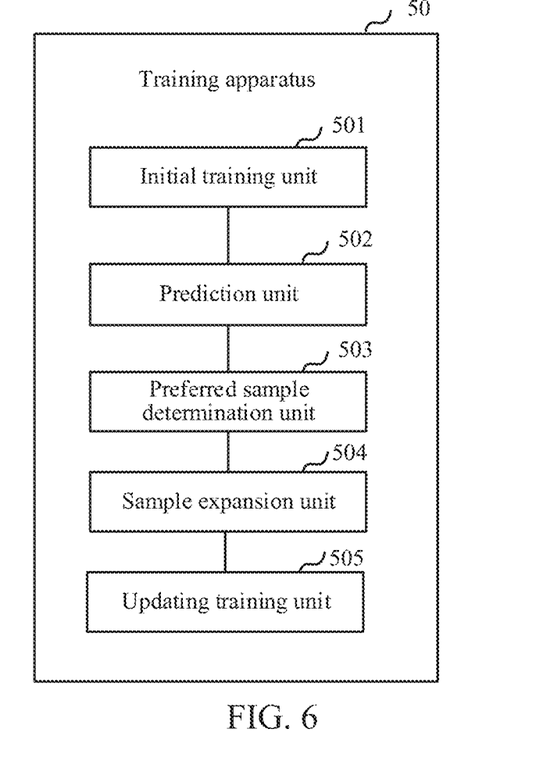
FIG. 6 is a functional block diagram of an apparatus for training a neural network model according to an embodiment of the present disclosure.

FIG. 6 is a functional block diagram of an apparatus for training a neural network model according to an embodiment of the present disclosure. As shown in FIG. 6, an apparatus 50 for training a neural network model according to an embodiment of the present disclosure includes an initial training unit 501, a prediction unit 502, a preferred sample determination unit 503, a sample expansion unit 504, and an updating training unit 505. The modules may respectively perform steps in the method for training a neural network model according to the embodiment of the present disclosure described above with reference to FIG. 3 to FIG. 5B. A person skilled in the art understands: these unit modules may be implemented in various ways by hardware alone, by software alone, or by a combination thereof, and the present disclosure is not limited to any of them.

The initial training unit 501 is configured to perform an initial training step S201 in which initial training is performed by using a first training sample set to obtain an initial neural network model, samples in the first training sample set being annotated samples.

The prediction unit 502 is configured to perform a prediction step S202 in which a prediction is performed on a second training sample set by using the initial neural network model to obtain a prediction result of each of training samples in the second training sample set, the samples in the second training sample set being unannotated samples.

The preferred sample determination unit 503 is configured to perform a preferred sample determination step S203 in which a plurality of preferred samples are determined from the second training sample set based on the prediction results.

The sample expansion unit 504 is configured to perform a sample expansion step S204 in which annotation results of the plurality of preferred samples are received and the plurality of preferred samples that are annotated are added to the first training sample set to obtain an expanded first training sample set.

The updating training unit 505 is configured to perform an updating training step S205 in which updating training is performed by using the expanded first training sample set to obtain an updated neural network model.

The apparatus 50 for training a neural network model according to the embodiment of the present disclosure may further include: a judging unit, configured to determine whether a training ending condition is satisfied, and end the training when the training ending condition is satisfied or instruct the prediction unit 502, the preferred sample determination unit 503, the sample expansion unit 504, and the updating training unit 505 to respectively repeat the prediction step S202, the preferred sample determination step S203, the sample expansion step S204, and the updating training step S205 when the training ending condition is not satisfied.

Specifically, the preferred sample determination unit 503 is configured to: determine an amount of information of each of the training samples in the second training sample set, and select a first predetermined quantity of samples having a large amount of information; and determine, based on a complexity of each of the first predetermined quantity of samples having a large amount of information and in ascending order by complexity, a second predetermined quantity of samples having a large amount of information from the first predetermined quantity of samples having a large amount of information as the plurality of preferred samples. The preferred sample determination unit 503 is configured to: determine an uncertainty and a diversity of each of the training samples in the second training sample set; and perform a weighted calculation on the uncertainty and the diversity to obtain the amount of information of each of the training samples.

Each of the training samples in the second training sample set has corresponding weak supervision information, and the preferred sample determination unit 503 is configured to determine the uncertainty of each of the training samples based on the corresponding weak supervision information and the prediction result of each of the training samples, and determine the diversity of each of the training samples based on similarities between each of the training samples and other training samples in the second training sample set. Each of the training samples in the second training sample set has the corresponding weak supervision information, and the complexity of each of the training samples is negatively correlated with a confidence of the corresponding weak supervision information of each of the training samples. The training ending condition includes the following: the preferred sample determination step does not generate a preferred sample anymore; or the updated neural network model satisfies a predetermined convergence condition. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 7:
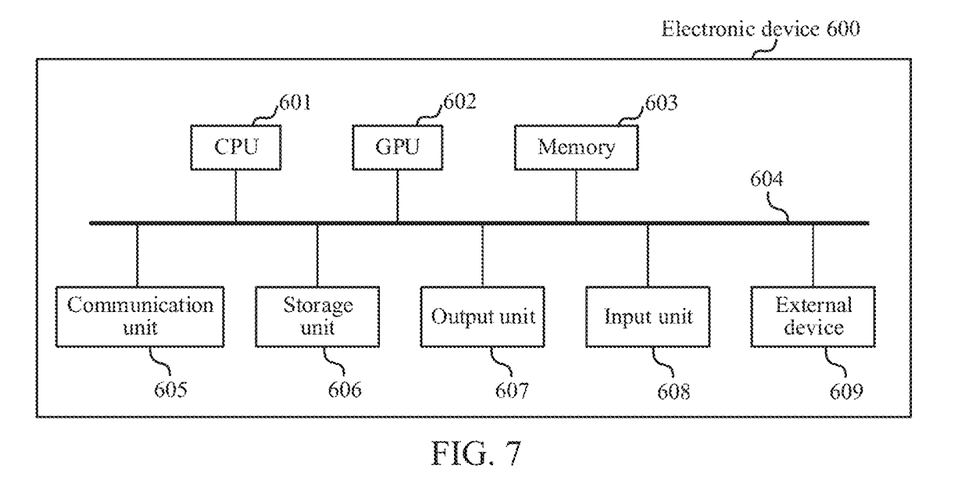
FIG. 7 is a hardware block diagram of an electronic device according to an embodiment of the present disclosure.

FIG. 7 is a hardware block diagram of an electronic device 600 according to an embodiment of the present disclosure. The electronic device according to the embodiment of the present disclosure includes at least a processor and a memory, configured to store computer program instructions. The computer program instructions, when loaded and executed by the processor, cause the processor to perform the foregoing method for training a neural network model.

The electronic device 600 shown in FIG. 7 includes: a central processing unit (CPU) 601, a graphics processing unit (GPU) 602, and a memory 603. The units are connected to each other through a bus 604. The central processing unit (CPU) 601 and/or the graphics processing unit (GPU) 602 may be used as the foregoing processor, and the memory 603 may be used as the foregoing memory storing the computer program instructions. In addition, the electronic device 600 may further include a communication unit 605, a storage unit 606, an output unit 607, an input unit 608, and an external device 609. The units are also connected to the bus 604.

Figure 8:
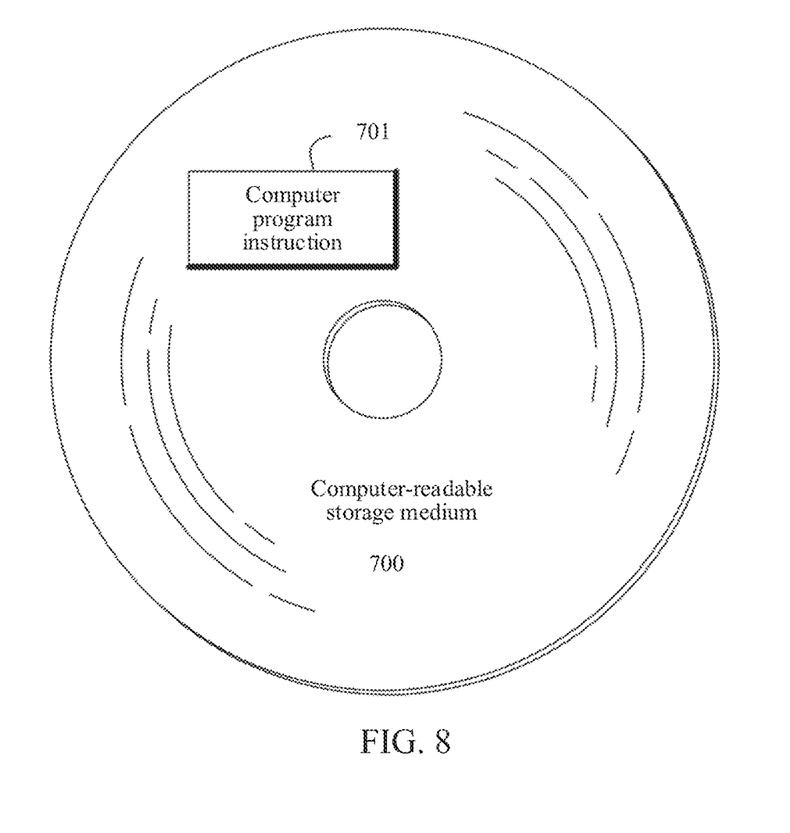
FIG. 8 is a schematic diagram of a computer-readable storage medium according to an embodiment of the present disclosure.

FIG. 8 is a schematic diagram of a non-transitory computer-readable storage medium according to an embodiment of the present disclosure. As shown in FIG. 8, the computer-readable storage medium 700 according to this embodiment of the present disclosure stores computer program instructions 701. When the computer program instructions 701 are executed by the processor, the method for training a neural network model according to the embodiments of the present disclosure described with reference to the foregoing drawings is performed. The computer-readable storage medium includes, but is not limited to, a volatile memory and/or a non-volatile memory. For example, the volatile memory may include a random access memory (RAM) and/or a cache. For example, the non-volatile memory may include a read-only memory (ROM), a hard disk, a flash memory, an optical disc, or a magnetic disk.

According to the method for training a neural network model, the method for processing an image, the apparatus for training a neural network model, the electronic device, the system for processing a medical image, and the computer-readable storage medium according to the embodiments of the present disclosure described above with reference to the drawings, samples having a large amount of information are found from the unannotated training sample set, to retain as much as possible valuable information provided by the training sample set, thereby avoiding a valuable information loss as a result of shrinking of the training sample set caused by random sampling. In addition, samples that are more easily detected are further selected from the samples having a large amount of information for annotation, and some samples that are more difficult to detect are gradually annotated during a plurality of iterations of training, so as to update and train the neural network model. In this way, the quantity of samples selected for annotation can be further reduced, overfitting that easily occurs during the deep learning can be overcome, and the training process is more robust. In addition, a quantity of iterations of active deep learning can be reduced, and a quantity of training samples can be significantly reduced and the training of the neural network model can be quickened while obtaining excellent performance. Moreover, by using the neural network model that has been trained based on the foregoing method for training a neural network model, a to-be-processed input image such as a medical image can be more efficiently and precisely processed.

A person of ordinary skill in the art may be aware that, the units and algorithm steps in the examples described with reference to the embodiments disclosed in this specification may be implemented by using electronic hardware or a combination of computer software and electronic hardware. Whether the functions are executed in a mode of hardware or software depends on particular applications and design constraint conditions of the technical solutions. A person skilled in the art can use different methods to implement the described functions for each particular application, but it shall not be considered that the implementation goes beyond the scope of the embodiments of the present disclosure.

The above describes basic principles of the present disclosure with reference to specific embodiments. However, the advantages, effects, and the like mentioned in the present disclosure are merely examples but not limitations. These advantages, effects, and the like cannot be considered to be necessary for the embodiments of the present disclosure. In addition, the specific details disclosed above are only for illustrative purposes and easy-to-understand functions rather than limitation, and the foregoing details do not limit the present disclosure for implementation of the foregoing specific details.

The block diagrams of the device, apparatus, equipment, and system involved in the present disclosure are merely illustrative examples and are not intended to require or imply that the device, apparatus, equipment, and system need to be connected, arranged, and configured in the manner shown in the block diagrams. Those skilled in the art realize that the device, apparatus, equipment, and system can be connected, arranged, and configured in any manner. Terms such as "include", "comprise", "have", and the like are open terms that mean "including but not limited to" and may be used interchangeably. The terms "or" and "and" used herein refer to the terms "and/or" and may be used interchangeably, unless the context clearly dictates otherwise. The expression "such as" used herein refers to the phrase "such as but not limited to" and may be used interchangeably with "such as".

In addition, as used herein, "or" used in a listing of items beginning with "at least one" indicates a separate listing. Therefore, for example, a listing of "at least one of A, B, or C" means A, or B or C, or AB or AC or BC, or ABC (that is, A and B and C). In addition, the word "exemplary" does not mean that the described example is preferred or better than other examples.

In the system and method of the present disclosure, the components or steps may be decomposed and/or recombined. These decompositions and/or recombinations shall be regarded as equivalent solutions of the present disclosure.

Various changes, substitutions, and alterations may be made to the technology described herein without departing from the technology taught by the appended claims. In addition, the scope of the claims of the present disclosure is not limited to the foregoing specific aspects such as the processing, the machine, the manufacturing, the event composition, the means, the methods, and the actions. Existing or to-be-developed processing, machines, manufacturing, event composition, means, methods, or actions later performing substantially the same functions or achieving substantially the same results as the corresponding aspects described herein may be used. Therefore, the attached claims include such processing, machine, manufacturing, event composition, means, methods or actions within its scope.

The foregoing description of the disclosed aspects is provided to enable a person skilled in the art to make modifications to or use the present disclosure. Various modifications to these aspects are apparent to a person skilled in the art, and the general principles defined herein can be applied to other aspects without departing from the scope of the present disclosure. Therefore, the present disclosure is not intended to be limited to the aspects shown herein but in accordance with the widest scope consistent with the principles and novel features disclosed herein.

The foregoing description has been given for the purposes of illustration and description. In addition, this description is not intended to limit the embodiments of the present disclosure to the form disclosed herein. Although a plurality of example aspects and embodiments have been discussed above, those skilled in the art realize some variations, modifications, changes, additions, and sub-combinations thereof

What is claimed is:

1. A method for training a neural network model, performed by an electronic device, the method comprising:
    performing an initial training by using a first training sample set to obtain an initial neural network model, samples in the first training sample set being annotated samples;
    performing a prediction on a second training sample set by using the initial neural network model to obtain a prediction result of each of training samples in the second training sample set, the samples in the second training sample set being unannotated samples;
    determining a plurality of preferred samples from the second training sample set based on the prediction results, further including:
        determining an amount of information of each of the training samples in the second training sample set;
        selecting a first predetermined quantity of samples having a large amount of information; and
        determining, based on a complexity of each of the first predetermined quantity of samples having a large amount of information and in ascending order by complexity, a second predetermined quantity of samples having a large amount of information from the first predetermined quantity of samples having a large amount of information as the plurality of preferred samples;
    adding the plurality of preferred samples that are annotated to the first training sample set to obtain an expanded first training sample set; and
    updating training of the initial neural network model by using the expanded first training sample set to obtain an updated neural network model until a training ending condition is satisfied.

2. The method according to claim 1, wherein the determining an amount of information of each of the training samples in the second training sample set comprises:
    determining an uncertainty and a diversity of each of the training samples in the second training sample set; and
    performing a weighted calculation on the uncertainty and the diversity to obtain the amount of information of each of the training samples.

3. The method according to claim 2, wherein each of the training samples in the second training sample set has corresponding weak supervision information, and the determining an uncertainty of each of the training samples in the second training sample set comprises:

determining the uncertainty of each of the training samples based on the corresponding weak supervision information and the prediction result of each of the training samples; and the determining a diversity of each of the training samples in the second training sample set comprises:

determining the diversity of each of the training samples based on similarities between each of the training samples and other training samples in the second training sample set.

4. The method according to claim 1, wherein each of the training samples in the second training sample set has the corresponding weak supervision information, and the complexity of each of the training samples is negatively correlated with a confidence of the corresponding weak supervision information of each of the training samples.

5. The method according to claim 1, wherein the training ending condition comprises the following:

the determining step does not generate a preferred sample anymore; or the updated neural network model satisfies a predetermined convergence condition.

6. The method according to claim 1, the method further comprising:

receiving an input image;

extracting a feature of the input image by using the updated neural network model; and outputting a processing result image based on the extracted feature.

7. An electronic device, comprising:

a processor; and a memory, configured to store computer program instructions, the computer program instructions, when loaded and executed by the processor, causing the processor to perform a plurality of operations including:

performing an initial training by using a first training sample set to obtain an initial neural network model, samples in the first training sample set being annotated samples;

performing a prediction on a second training sample set by using the initial neural network model to obtain a prediction result of each of training samples in the second training sample set, the samples in the second training sample set being unannotated samples;

determining a plurality of preferred samples from the second training sample set based on the prediction results, further including:

determining an amount of information of each of the training samples in the second training sample set;

selecting a first predetermined quantity of samples having a large amount of information; and determining, based on a complexity of each of the first predetermined quantity of samples having a large amount of information and in ascending order by complexity, a second predetermined quantity of samples having a large amount of information from the first predetermined quantity of samples having a large amount of information as the plurality of preferred samples;

adding the plurality of preferred samples that are annotated to the first training sample set to obtain an expanded first training sample set; and updating training of the initial neural network model by using the expanded first training sample set to obtain an updated neural network model until a training ending condition is satisfied.

8. The electronic device according to claim 7, wherein the determining an amount of information of each of the training samples in the second training sample set comprises:

determining an uncertainty and a diversity of each of the training samples in the second training sample set; and performing a weighted calculation on the uncertainty and the diversity to obtain the amount of information of each of the training samples.

9. The electronic device according to claim 8, wherein each of the training samples in the second training sample set has corresponding weak supervision information, and the determining an uncertainty of each of the training samples in the second training sample set comprises:

determining the uncertainty of each of the training samples based on the corresponding weak supervision information and the prediction result of each of the training samples; and the determining a diversity of each of the training samples in the second training sample set comprises:

determining the diversity of each of the training samples based on similarities between each of the training samples and other training samples in the second training sample set.

10. The electronic device according to claim 7, wherein each of the training samples in the second training sample set has the corresponding weak supervision information, and the complexity of each of the training samples is negatively correlated with a confidence of the corresponding weak supervision information of each of the training samples.

11. The electronic device according to claim 7, wherein the training ending condition comprises the following:

the determining step does not generate a preferred sample anymore; or the updated neural network model satisfies a predetermined convergence condition.

12. The electronic device according to claim 7, wherein the plurality of operations further comprise:

receiving an input image;

extracting a feature of the input image by using the updated neural network model; and outputting a processing result image based on the extracted feature.

13. A non-transitory computer-readable storage medium, storing computer program instructions, the computer program instructions, when loaded and executed by a processor of an electronic device, causing the electronic device to perform a plurality of operations including:

performing an initial training by using a first training sample set to obtain an initial neural network model, samples in the first training sample set being annotated samples;

performing a prediction on a second training sample set by using the initial neural network model to obtain a prediction result of each of training samples in the second training sample set, the samples in the second training sample set being unannotated samples;

determining a plurality of preferred samples from the second training sample set based on the prediction results, further including:

determining an amount of information of each of the training samples in the second training sample set:

selecting a first predetermined quantity of samples having a large amount of information; and determining, based on a complexity of each of the first predetermined quantity of samples having a large amount of information and in ascending order by complexity, a second predetermined quantity of samples having a large amount of information from the first predetermined quantity of samples having a large amount of information as the plurality of preferred samples;

adding the plurality of preferred samples that are annotated to the first training sample set to obtain an expanded first training sample set; and updating training of the initial neural network model by using the expanded first training sample set to obtain an updated neural network model until a training ending condition is satisfied.

14. The non-transitory computer-readable storage medium according to claim 13, wherein the determining an amount of information of each of the training samples in the second training sample set comprises:

determining an uncertainty and a diversity of each of the training samples in the second training sample set; and performing a weighted calculation on the uncertainty and the diversity to obtain the amount of information of each of the training samples.

15. The non-transitory computer-readable storage medium according to claim 14, wherein each of the training samples in the second training sample set has corresponding weak supervision information, and the determining an uncertainty of each of the training samples in the second training sample set comprises:

determining the uncertainty of each of the training samples based on the corresponding weak supervision information and the prediction result of each of the training samples; and the determining a diversity of each of the training samples in the second training sample set comprises:

determining the diversity of each of the training samples based on similarities between each of the training samples and other training samples in the second training sample set.

16. The non-transitory computer-readable storage medium according to claim 13, wherein each of the training samples in the second training sample set has the corresponding weak supervision information, and the complexity of each of the training samples is negatively correlated with a confidence of the corresponding weak supervision information of each of the training samples.

17. The non-transitory computer-readable storage medium according to claim 13, wherein the training ending condition comprises the following:

the determining step does not generate a preferred sample anymore; or the updated neural network model satisfies a predetermined convergence condition.

* * * * *